United States Patent [19]

Nakagawa

[11] Patent Number: 4,902,220

[45] Date of Patent: Feb. 20, 1990

[54] VERTICAL INJECTION MOLDING MACHINE

[75] Inventor: Tatsuzi Nakagawa, Sagamihara, Japan

[73] Assignee: Aida Engineering, Ltd., Kanagawa, Japan

[21] Appl. No.: 219,157

[22] PCT Filed: Nov. 10, 1986

[86] PCT No.: PCT/JP86/00570

§ 371 Date: Jun. 29, 1988

§ 102(e) Date: Jun. 29, 1988

[87] PCT Pub. No.: WO88/03470

PCT Pub. Date: May 19, 1988

[51] Int. Cl.$^4$ .............................................. B29C 45/68
[52] U.S. Cl. ..................................... 425/574; 425/589; 425/590
[58] Field of Search ........................ 425/574, 589, 590

[56] References Cited

U.S. PATENT DOCUMENTS 2,484,777 10/1949 Ziska ................... 425/192 R
3,162,900 12/1964 Huelskamp ................ 425/189

FOREIGN PATENT DOCUMENTS 0055464 7/1982 European Pat. Off. .
1182422 11/1964 Fed. Rep. of Germany .
1554768 6/1970 Fed. Rep. of Germany .
2299960 9/1976 France .
217224 9/1986 Japan .................. 425/574
1507102 4/1978 United Kingdom .

OTHER PUBLICATIONS

Japanese Patent Abstract, vol. 10, No. 114 (M-473) (2171), Apr. 26, 1987, AIDA ENGINEERING.

*Primary Examiner*—Jay H. Woo
*Assistant Examiner*—Timothy W. Heitbrink
*Attorney, Agent, or Firm*—Sandler & Greenblum

[57] ABSTRACT

A vertical injection molding machine having an upper die (26) and a lower die (27) which are adapted to be brought together in the vertical direction by the force produced by a die closing device. The injection molding machine has an injection unit 1 disposed below the lower die (27) and is hinged through a hinge shaft (36) to a truck (35) movable along rails (37), such that the injection unit 1 is swingable vertically about the axis of the hinge shaft (36). The vertical swinging motion of the injection unit 1 is effected by cylinders (38) connected to an injection head (2) of the injection unit (1). A compression forming cylinder device (70) is provided on the lower end of each of a plurality of tie-bars which are connected between the upper die (26) and the lower die (27). Each of the compression forming cylinder devices (70) operates to urge the upper die (26) upward away from the lower die (27) through a pressing member (68), thus creating a small clearance between the upper die (26) and the lower die (27) when these dies are held in the closing position by the force of a die closing device (3).

16 Claims, 11 Drawing Sheets

VERTICAL INJECTION MOLDING MACHINE

DESCRIPTION

1. Field of the Invention

The present invention relates to a vertical injection molding machine having an upper die and a lower die which define a die cavity therebetween when brought together by a relative vertical movement between them.

2. Description of Background and Relevant Materials

In general, an injection molding machine has a die closing device for closing a pair of dies, and an injection unit. Since the injection of molten resin into the die cavity is effected by the injection unit, the die closing device and the injection unit are mounted on a frame in a predetermined relationship to each other.

In the use of such an injection molding machine, it is often required to conduct a trial operation of the injection unit. Such a trial injection is necessary, for example, when the dies on the die closing device have been changed for the production of a different article or when the kind of the resin material is changed. After the trial injection, the operator inspects the nozzle of the injection unit for the purpose of confirmation of safe injection of the resin from the injection unit. In the conventional injection molding machine of the type described, however, this inspection takes a considerably long time and requires laborious work, because of difficulty in obtaining a large clearance between the injection unit and the die closing device, due to the fixed positional relationship between the injection unit and the die closing device.

In the operation of an injection molding machine, a molten resin is injected into the die cavity between the pair of dies, after the die cavity is closed by the die closing device which usually includes a die closing cylinder. If the resin solidifies while the die cavity is closed, i.e., with the dies clamped by the die closing device, a pressure gradient is caused in the molten resin with the result that the molded article exhibits a shrink mark or deformation. In order to overcome this problem, a method known as "compression injection molding method" has been used in which, after the dies are closed by a main cylinder, a compression forming cylinder is operated to slightly open the dies and, thereafter, the molten resin is injected and the cylinders are closed again.

Two types of compression injection molding method have been known: a method known as "micro-molding method" and a method known as "Rollinks" method. In the micro-molding method, the force produced by the injection pressure is born by the die closing force, as in the case of ordinary injection molding method. This method, therefore, suffers from a disadvantage in that the die closing force cannot be utilized in the compression which requires a large compression force. Another problem is that, since the compression forming cylinder is installed within the dies, the size of the hydraulic cylinder is limited so that only a small compression force is available. On the other hand, in the Rollinks method, the volume in the cavity is increased by the internal pressure of the cavity and then compression is effected by making use of the die closing force. This method suffers from a problem in that the thickness size of the article unfavorably fluctuates.

Furthermore, these known methods involve a common disadvantage in that, since the compression forming cylinder is combined with the dies, it is necessary to prepare the compression forming cylinder for each of a plurality of die sets for different articles to be formed. This undesirably raises the installation cost and inevitably increases the size of the die set. A large storage space is required for storing a lot of die sets each of which has a large size.

Under these circumstances, the present invention is aimed at providing, as its first object, a vertical injection molding machine which remarkably facilitates the maintenance and inspection thereof.

A second object of the present invention is to provide a vertical injection molding machine which has, in addition to the features mentioned above, an advantage in that a compression forming cylinder device, which is primarily intended for improving the quality of the product, has an extended adaptability.

SUMMARY OF THE INVENTION

According to one aspect of the present invention, there is provided a vertical injection molding machine in which a pair of dies constituting a die closing device are adapted to be closed in the vertical direction, comprising carriage means disposed on a lower part of the die closing device and movable in the direction transverse to the die closing direction, the movable means carrying an injection unit so that the injection unit can easily be brought by the carriage means to a position for easy maintenance and inspection.

According to another aspect of the present invention, die separating means are provided on a part other than dies, for the purpose of moving one of the dies in the closed positions away from each other, thereby extending the adaptability of the compression forming cylinder.

DETAILED DESCRIPTION OF THE PREFERRED EMBODIMENTS

Figure 1:
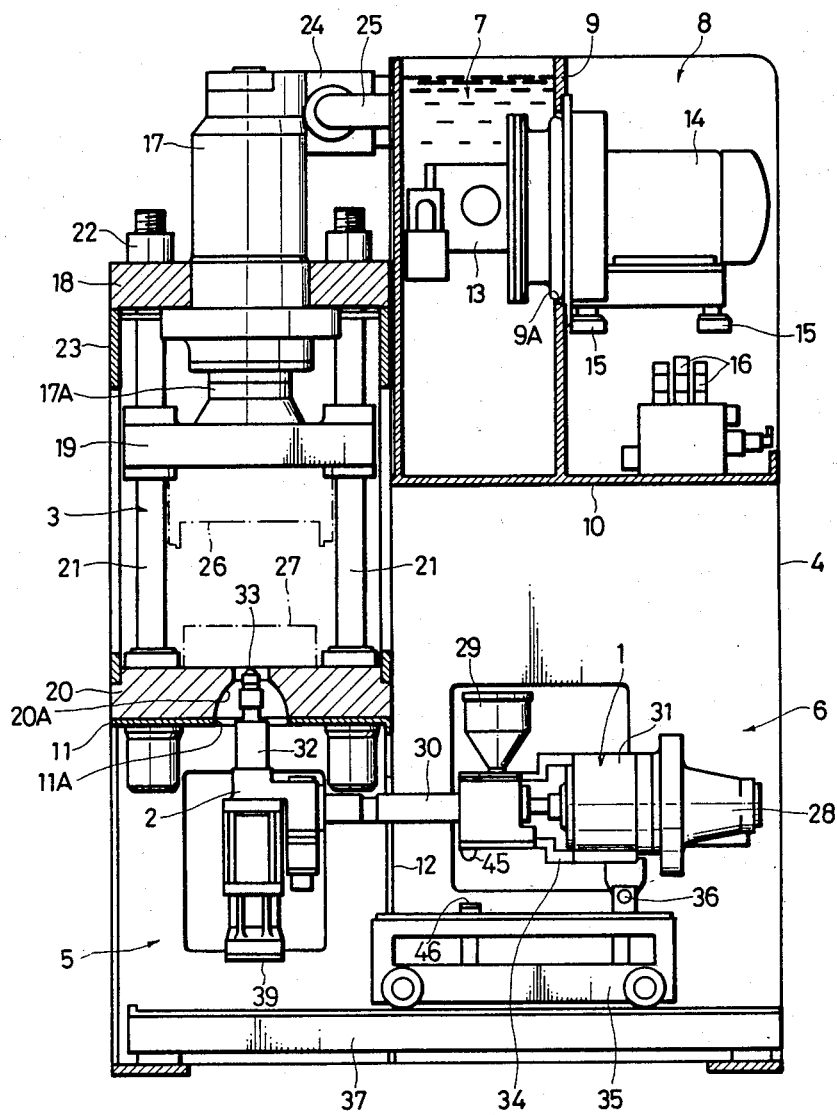
FIG. 1 is a side elevational sectional view of a first embodiment of an injection molding machine in accordance with the present invention.

Preferred embodiments of the invention will be fully described hereinafter with reference to the accompanying drawings.

FIGS. 1 to 5 shows a first embodiment of the present invention which constitutes a first invention. An injection molding machine of this embodiment has an injection unit 1 with an injection head 2 directed upward. The injection molding machine also has a pair of dies 26 and 27 associated with a die closing device 3 which is adapted to opened and close the dies in the vertical direction.

The injection unit 1 and other parts are carried by a large-sized box-like frame 4 which defines at its lower part rooms 5 and 6 and at its upper part rooms 7 and 8. The rooms 7 and 8, which are formed on the upper side of the room 6, are separated from each other by a partition wall 9. The top wall 10 of the room 6 is disposed at a level which is slightly above the top wall 11 of the room 5. Thus, the frame 4 has an L-shaped side elevation constituted by a taller part defining the rooms 6,7 and 8 and a lower part defining the room 5.

The rooms 5 and 6 are separated from each other by means of a partition wall 12 which has an aperture formed therein. Thus, the aperture provides a communication between the rooms 5 and 6. The rooms 5 and 6 therefore constitute a space for accommodating the injection unit 1.

The room 7 is used as an oil tank which is filled with an oil and which accommodates a hydraulic pump 13. A motor 14 for driving the hydraulic pump 13 is disposed in the room 8. More specifically, the motor 14 is mounted on a bracket 15 attached to the surface of the wall of the room 8 and is drivingly connected to the hydraulic pump 13 through a shaft which extends through a bore 9A formed in the partition wall 9. The hydraulic pump 13 and the motor 14 in combination constitute a hydraulic unit. The oil discharged by the hydraulic pump 13 is supplied to various hydraulic devices through a change-over valve 16 disposed in the room 8.

The die closing device 3 is disposed above the room 5. The closing device 3 includes the following parts: a die closing cylinder 17; a base member 18 for holding the die closing cylinder 17; a movable platen 19 connected to the ram 17A of the vertical cylinder 17; a stationary platen 20; tie-bars 21 through which the stationary platen 20 is connected to the base member 18; and intermediate members 23 which are disposed between the base member 18 and the stationary platen 20 and are adapted to be compressed as nuts 22 screwed to the tie-bars 21 are tightened. A pre-fill valve 24 is connected at its one end to the die closing cylinder 17 and at its other end through a pipe 25 to the room 7 which constitutes the oil tank. The upper die 26 and the lower die 27 mentioned before are secured, respectively, to the lower side of the movable platen 19 and to the upper side of the stationary platen 20.

The die closing device 3 as a whole has a columnar construction with a rectangular cross-section. The die closing device 3, when situated on the top wall 11 of the room 5, fills the vacancy of the L-shape of the frame 4. Thus, the injection molding machine as a whole has a compact arrangement which makes efficient use of spaces as will be seen from FIGS. 1, 2 and 3.

The injection molding machine of this embodiment has shifting means which is composed of rails 37 laid on the bottom of the rooms 5 and 6 and a truck 35 which are adapted to run along the rails 37. The injection unit 1 is mounted on the truck 35. The injection unit 1 includes a hydraulic motor 28 adapted to be supplied with oil from the hydraulic pump 13, a driving unit 31 actuated by the hydraulic motor 28, a material charging hopper 29, a cylinder 30 accommodating a kneading/plasticizing screw which is driven by the driving unit 31, an injection cylinder 32 attached to the distal end of the cylinder 30 and accommodating an injection plunger, and a nozzle provided on the cylinder 32. The injection cylinder 32 and the nozzle 33 in combination constitute the injection head 2 mentioned before.

The hopper 29, the cylinder 30 and other associated parts are connected to the driving unit 31 through a connecting member 34. The driving unit 31 is secured to the truck 35 by means of a hinge shaft 36 about which the driving unit 31 as a whole is swingable within a vertical plane. Thus, the injection unit 1 is tiltable up and down.

Figure 2:
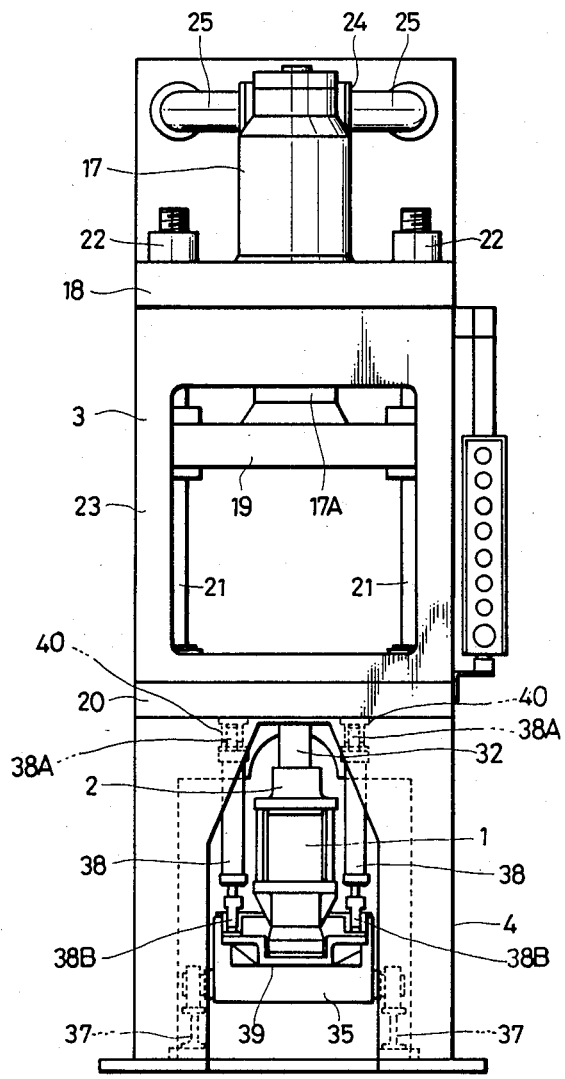
FIG. 2 is a front elevational view of the injection molding machine shown in FIG. 1.
Figure 3:
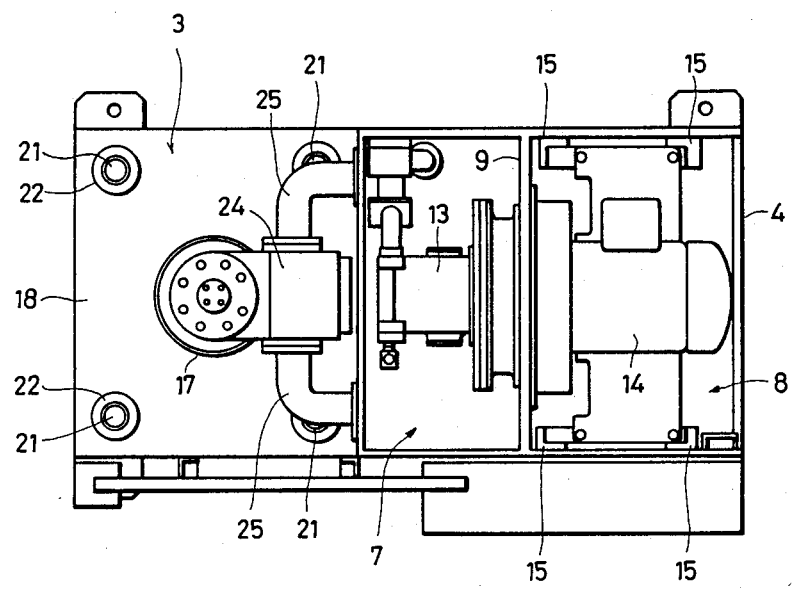
FIG. 3 is a plan view of the injection molding machine shown in FIG. 1.
Figure 4:
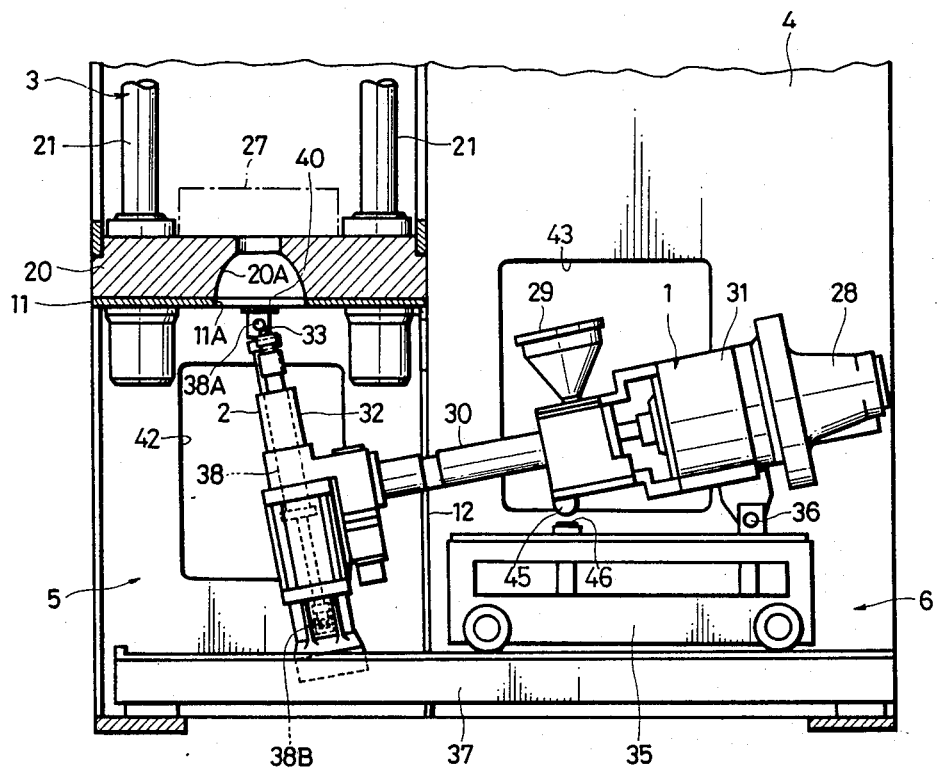
FIG. 4 is a fragmentary sectional side elevational view of of the injection molding machine shown in FIG. 1 with an injection nozzle spaced apart from a lower die.
Figure 5:
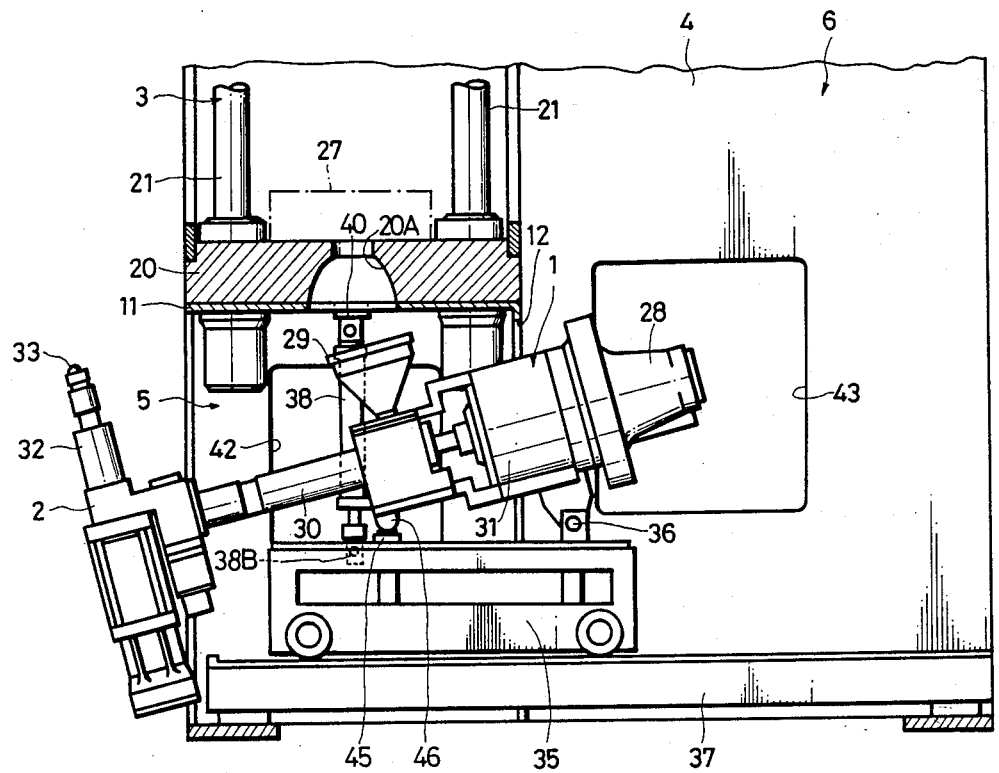
FIG. 5 is a view similar to that of FIG. 4, with an injection unit pulled out to a position for maintenance and inspection.
Figure 6:
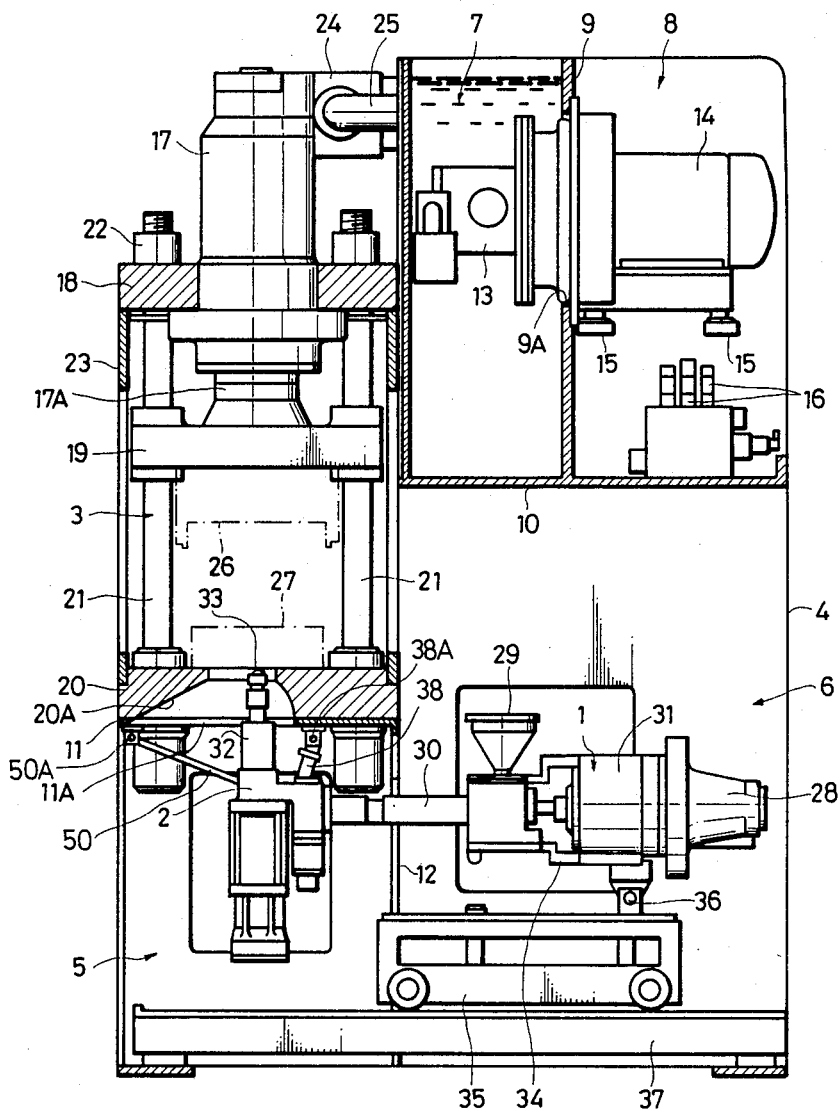
FIG. 6 is a sectional side elevational view of a second embodiment of the injection molding machine in accordance with the present invention.
Figure 7:
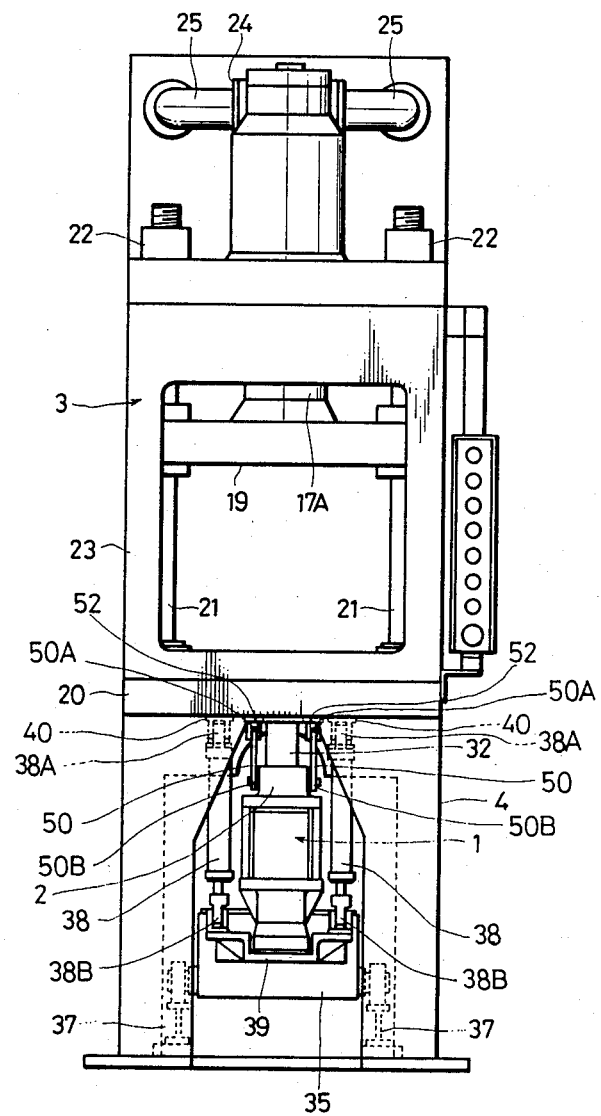
FIG. 7 is a front elevational view of the injection molding machine shown in FIG. 6.

As will be seen from FIG. 2, hydraulic driving cylinders 38 are arranged on the left and right sides of the injection head 2 of the injection unit 1. The upper end 38A of each of the cylinders 38 is connected to a bracket 40 on the stationary platen 20, while the lower end 38b of the same is connected to a bracket 39 which is provided on a lower portion of the injection head 2. Thus, the injection head 2 is suspended by the cylinders 38. In other words, the weight of the injection unit 1 which tends to cause a downward swinging motion of the same about the hinge shaft 36 is born by the cylinders 38.

The arrangement is such that a retracting operation of the cylinders 38 causes the injection unit 1 to be swung upward about the shaft 36, so that the nozzle 33 of the injection head 2 is brought into contact with the lower die 27, through an aperture 11A formed in the top wall 11 and an aperture 20A formed in the stationary platen 20, as shown in FIG. 1. In this state, it is possible to inject a molten resin into the die cavity formed by the upper and lower dies 26 and 27 which are held in the closed state by the action of the die closing cylinder 17. As stated before, the cylinders 38 have upper ends 38A connected to the stationary platen 20 to which the lower die 27 is secured. Therefore, the retracting motion of the cylinders 38 enables the nozzle 33 of the injection head 2 to be precisely aligned with a spool bush of the lower die 27, after lifting the injection head 2.

In the use of this injection molding machine, it is often required to change the kind of the resin to be injected. This in turn requires confirmation of safe injection of the new resin from the nozzle 33 and, hence, the inspection of the nozzle 33 and associated parts. When an inspection is required for this or other purposes, the cylinders 38 are extended to swing the injection unit 1 downward about the axis of the shaft 36, so that the injection head 2 is lowered and the nozzle 33 is retracted through the apertures 20A and 11A formed in the stationary platen 20 and the top wall 11. The downward swinging motion of the injection unit 1 about the axis of the shaft 36 causes the truck 35 to be moved along the rails 37, so that the nozzle 33 and other parts associated parts are exposed for inspection, thus facilitating the inspection and other necessary works.

The injection unit 1 as a whole can be freed from the stationary platen 20 as the lower ends 38B of the cylinders 38 are disconnected from the bracket 39 of the injection head 2. In this state, the injection unit 1 is independent from the cylinder closing device 3, so that the truck 35 can be moved along the rails 37 over the entire length of the rails 37. The injection unit 1 has a stopper member 45 which is adapted to rest on a support 46 when the injection unit 1 has been swung downward about the axis of the shaft 36. In this state, as the truck 35 is moved along the rails 37 away from the room 5, the injection head 2 can be extracted from the room 5. This facilitates the inspection, repair and other necessary work not only of the nozzle 33 and its associated parts but also of the injection head 2 as a whole, thus assuring a high efficiency of these works. When the truck 35 is fully moved to the position remote from the room 5, the hydraulic motor 28 and other parts associated therewith can be projected out of the room 6. This in turn facilitates the inspection, repair and other works on the hydraulic motor 28 and other associated parts. Furthermore, access windows 42 and 43 are formed in the walls of the rooms 5 and 6. Therefore, the repair and other necessary works can be conducted easily also through these access windows 42, 43, by moving the truck 35 so as to bring the objective portion of the injection unit into alignment with the windows 42 and 43.

A second embodiment of the invention will be described hereinafter with reference to FIGS. 6 to 9. In these Figures, the same reference numerals are used to denote the same parts as those used in the first embodiment, and detailed description of such parts is omitted or simplified.

The second embodiment is distinguished from the first embodiment in that a link mechanism 51 is constituted by the injection unit 1, cylinders 38 suspending the injection head 2, and link members 50.

The aperture 20A formed in the stationary platen 20 is so shaped and sized as to permit the nozzle 33 to be moved therethrough. More specifically, the aperture 20A is enlarged at its left portion as viewed in FIG. 6. The positions at which the upper ends 38A of the cylinders 38 are secured to the stationary platen 20 are closer to the driving unit 31 of the injection device 1 than in the first embodiment, so that the cylinder 38 is inclined such that its left end is at a level below the right end of the same as viewed in FIG. 6. In consequence, the injection head 2 is projected out of the room 5 as the cylinder 38 is extended.

The link members 50 have upper ends 50A which are rockably secured to brackets 52 which are disposed on both sides of the injection cylinder 32 at positions opposing the upper ends 38A of the cylinders 30. The lower ends 50B of the link members 50 are connected to a substantially mid portion of the injection head 2 as viewed in the heightwise direction. Thus, the link members 50 are inclined such that the right ends thereof are positioned at a level below the left ends of the same.

In the operation of the second embodiment, the extending operation of the cylinders 38 produces a downward force component which acts on the injection unit 1 to cause the latter to be swung downward about the axis of the shaft 36. The extending operation of the cylinders 38 also produces a horizontal force component which causes the truck 35 to be moved forward along the rails 37. In this state, the link members are swung about their upper ends along arcuate paths. Since the injection head 2 serves to maintain a constant distance between the lower ends 38B of the cylinders 38 and the lower ends 50B of the link members 50, the swinging of the link members 50 causes the lower ends 38B of the cylinders 38 to be moved forward, so that the cylinders 38 are progressively leveled from the inclined position as they are extended. This in turn causes the the aforementioned horizontal force component for forwardly driving the truck 35 to be increased, so that the truck 35 is driven forward by a large distance, thus forwardly moving the injection unit 1.

Figure 9:
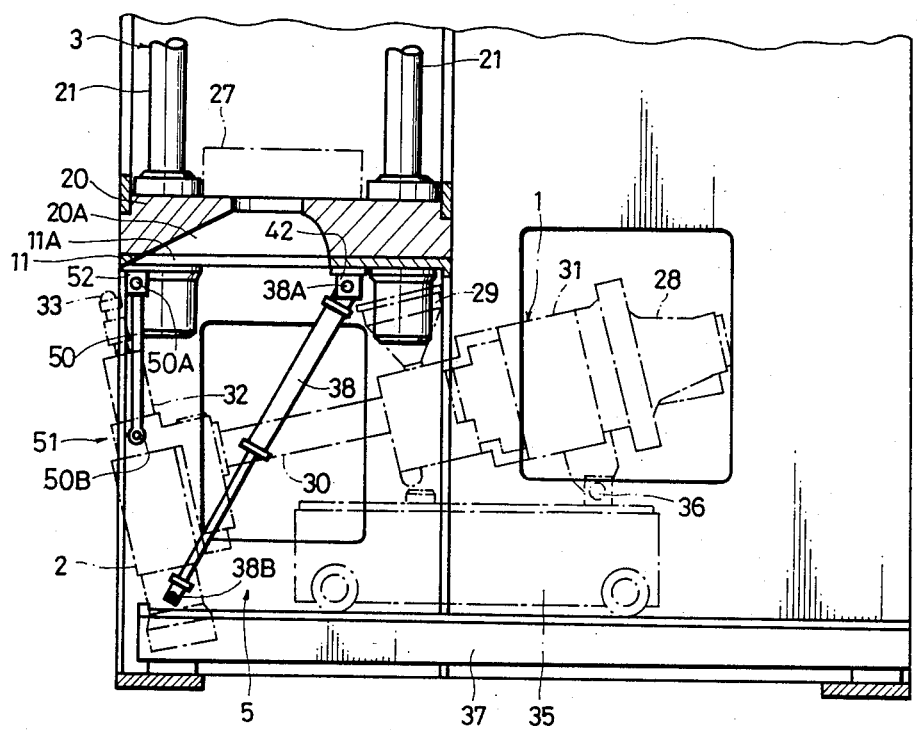
FIG. 9 is a view similar to that in FIG. 8, illustrating the state after the operation of the link mechanism.

As will be seen from FIG. 9, the cylinders 38 are fully extended when the link members 50 have been swung almost to vertical positions. In this state, the nozzle 33 of the injection device 1 has been forwardly extracted out of the room 5, so that the nozzle 33 and the parts therearound are exposed to permit an easy access thereto. It is thus possible to conduct necessary work such as inspection on the nozzle 3 and other parts while they are exposed, thus improving the efficiency of the work remarkably.

Figure 8:
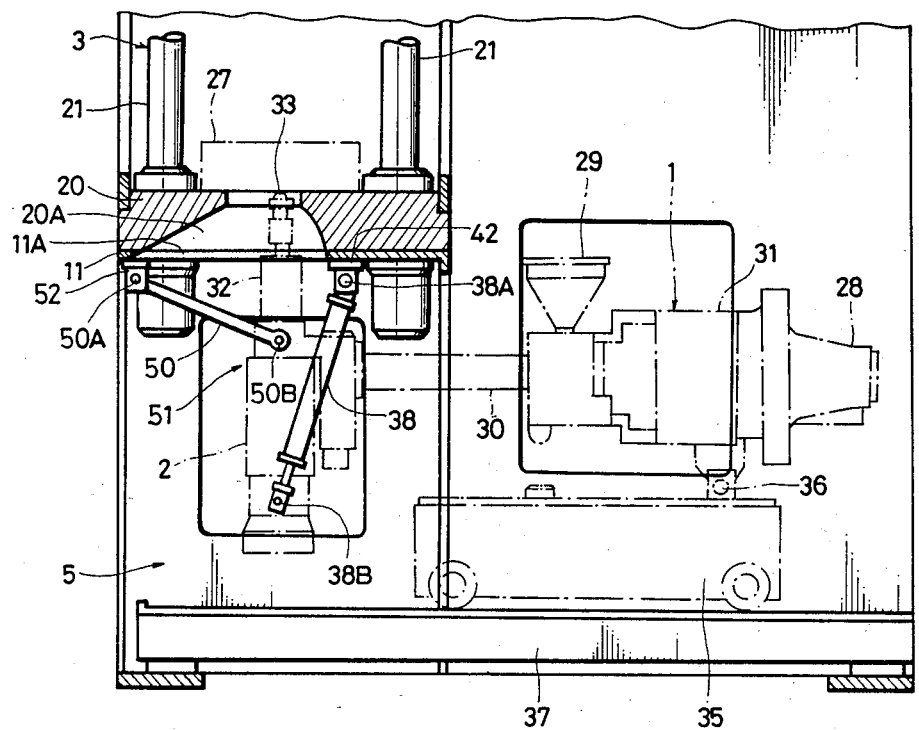
FIG. 8 is an enlarged view of a part of the injection molding machine shown in FIG. 6, showing particularly a link mechanism.

After the completion of the work, the cylinders 38 are retracted so that the above-explained series of operation is reversed to cause the link mechanism 51 to upwardly swing the injection unit 1, while driving the truck 35 backward, so that the injection head 2 is moved into vertical position to bring the nozzle 33 into contact with the lower die 27 as shown in FIG. 8.

It will be seen that, in the second embodiment described hereinbefore, the movement of the injection head 2 into and out of the room 5 can be effected simply by the extending and retracting motion of the cylinders 38, so that the necessary work such as inspection can be completed in a very short time, thus improving the efficiency remarkably.

Figure 10:
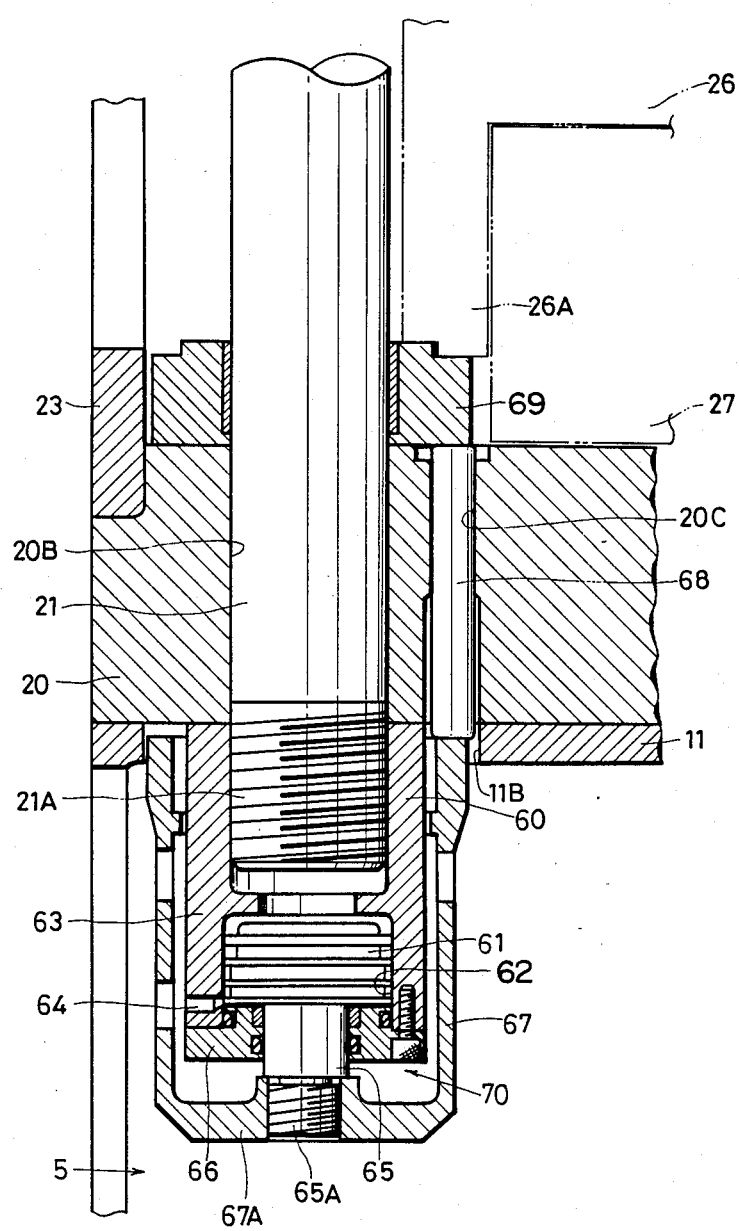
FIG. 10 is a sectional view of a compression forming cylinder device.
Figure 11:
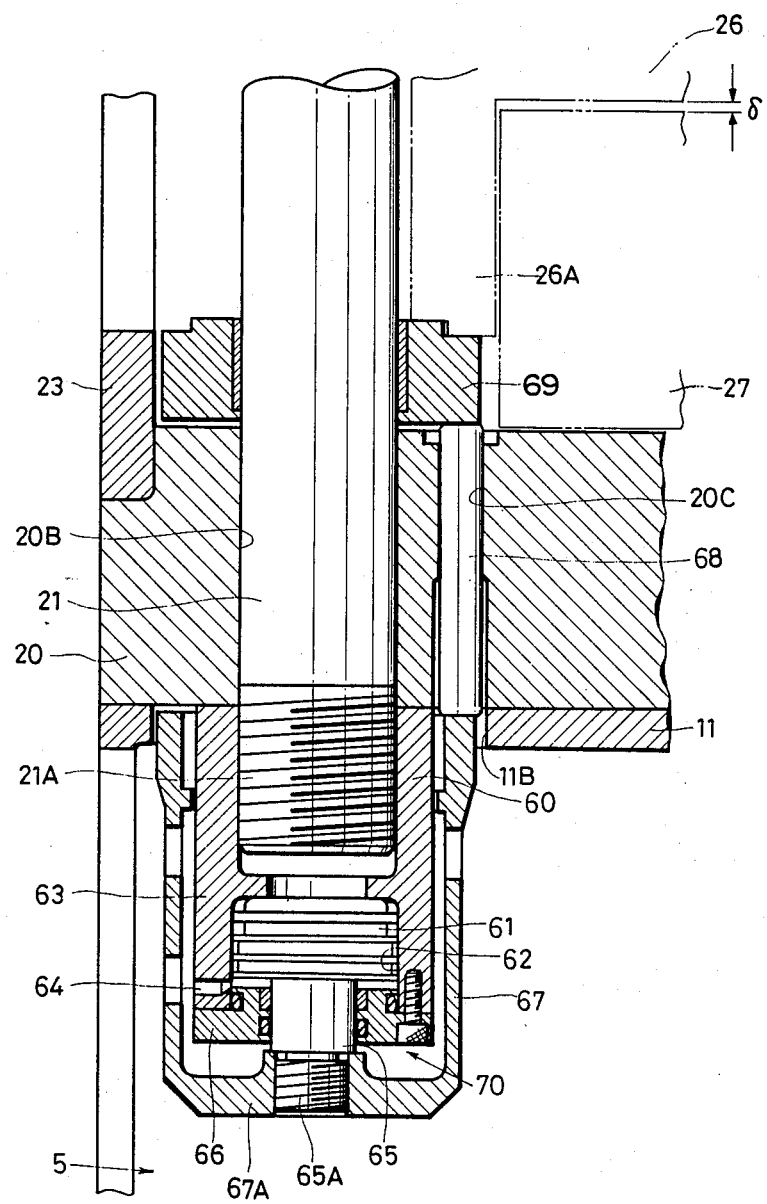
FIG. 11 is a view similar to that in FIG. 10, illustrating the state after the operation of the compression forming cylinder device.

FIGS. 10 and 11 show an embodiment of the vertical injection molding machine in accordance with a second embodiment. This vertical injection molding machine features a novel compression forming cylinder device 70. The compression forming cylinder device 70 is incorporated in the portion where each tie-bar 21 is connected to the stationary platen 20 and is disposed coaxially with the tie-bar 21. The construction of the compression forming cylinder is shown in a larger scale in FIGS. 10 and 11. In these Figures, the same reference numerals are used to denote the same parts or members as those used in the preceding embodiments.

Referring to FIG. 10, the lower end of each tie-bar 21 is extended through an aperture 20B formed in the stationary platen 20 and is threaded as at 21A. The threaded end 21A of the tie-bar 21 projects into the room 5 and a nut 60 is screwed to the threaded end 21A. As the nuts 60 on all tie-bars 21 are tightened, the base member 18 and the stationary platen 20 are fastened together through the intermediary of the intermediate members 23.

A piston chamber 62 is formed in each nut 60. The piston chamber 62 receives a piston 61 for vertical sliding motion therein. Thus, each nut 60 constitutes a compression forming cylinder 63. Thus, in this embodiment, the nuts 60 associated with the tie-bars 21 also serve as compression forming cylinders 63, thus reducing the number of parts in the injection molding machine. Each compression forming cylinder 63 is provided in the wall thereof with a port 64 for allowing pressurized oil to be supplied into the cylinder 63, and the lower end of the cylinder 63 is closed by a closure member 66 which is provided with a bore through which a piston rod 65 connected to the piston 61 is slidably extended.

The compression forming cylinder 63 is covered at its outer peripheral surface by a cap member 67 which constitutes a movable member. A threaded lower end 65A of the piston rod 65 is screwed into threaded bore in the bottom 67A of the cap member 67, so that the piston rod 65 is integrated with the cap member 67. The upper portion of the cap member 67 is received in an aperture 11B formed in the top wall 11 of the room 5. On the other hand, the stationary platen 20 has guide bores 20C which vertically slidably receive pin-shaped pressing members 68. At the upper side of the stationary platen 20, a spacer member 69 is slidably fitted around each tie-bar 21. When the dies are closed, the spacer members 69 contact the outer peripheral portion 26A of the upper die 26.

The compression forming cylinder device 70 having the described construction is provided on each of four tie-bars 21. Thus, the compression forming cylinders 63 are provided on the lower ends of the tie-bars 21 which are structural parts of the injection molding machine. Since the space around the lower ends of the tie-bars are dead spaces where no structural parts exist, the arrangement of the described embodiment offers an efficient use of such dead spaces, thus realizing a compact construction of the injection molding machine.

In operation, the die closing cylinder 17 is activated to close the die cavity formed between the upper die 26 and the lower die 27, and a molten resin is injected to fill the die cavity. Then, pressurized oil is supplied into the piston chambers 62 of the compression forming cylinders 63, thereby lifting the pistons 61 as shown in FIG. 11. Since the piston rods 65 are arranged to act on the movable upper die 26 through the cap members 67, pressing members 68 and the spacers 69, the upward movement of the piston 61 and the piston rods 65 cause the upper die 26 to be moved slightly upward, thus creating a die opening of an amount expressed by δ in FIG. 11. This die opening effectively cancels any pressure gradient which may exist in the molten resin which has been injected into the die cavity.

After elapse of a predetermined time, the pressure of the oil supplied to the piston chambers 62 is reduced so as to cause the upper die 26 to be lowered by the die closing force produced by the die closing cylinder 17, while lowering the spacer members 69, pressing members 68, cap members 67, piston rods 65 and the piston 61.

It will be seen that the compression forming cylinder devices are not directly coupled to or incorporated in the upper die 26 nor in the lower die 27. Therefore, it is not necessary to replace the compression forming cylinder devices each time the die set is replaced for the production of a new type of articles. In other words, the compression forming cylinder devices can be used commonly for a plurality of different die sets, i.e., the adaptability of the compression forming cylinder devices is widened.

Different die sets may have different heights of the upper die 26. Such a difference, however, can be absorbed without difficulty by preparing a plurality of sets of the spacer members 69 and selectively using spacer members of a suitable height.

In the described embodiments, the cylinders 38 are used for the purpose of bringing the nozzle 33 of the injection unit 1 into contact with the lower die 27. The use of such cylinders 38, however, is not essential and the arrangement may be such that the nozzle 33 is brought into contact with the lower die 27 by the force produced by a driving means provided on the truck 35 and adapted to cause the injection unit 1 to be swung up and down. Other alternative arrangements may be possible provided that the injection unit 1 is mounted on the truck 35.

The cylinders 38, which are described as being hydraulic cylinders in the described embodiments, may be designed such that they accommodate springs which act to retract the piston rods. With such an arrangement, it is possible to retract the piston rods even in the event of a failure in the hydraulic circuit, thus preventing any accidental separation of the nozzle 33 from the lower die 27.

As will be fully understood from the foregoing description, the present invention provides a vertical injection machine which is improved in such a manner as to facilitate various works such as inspection and maintenance and which can broaden the adaptability of the compression forming cylinder devices.

The invention is suitable for use in the field of molding technology for molding various articles such as containers.

I claim:

1. A vertical injection molding machine having a pair of dies and a die closing device for opening and closing said dies in a vertical direction, vertical injection molding machine comprising:
   (a) frame means;
   (b) an injection unit having an injection nozzle which faces said die closing device disposed in said frame means;
   (c) means for shifting said injection unit to a predetermined position; and
   (d) a link mechanism having a cylinder, said cylinder being connected to said frame means and said injection nozzle, said cylinder supporting said injection nozzle and moving said injection nozzle from said die closing device in cooperation with said shifting means, and said link mechanism further including link bars which guide said nozzle to move outside of said frame means.

2. A vertical injection molding machine according to claim 1, wherein said injection unit is disposed below of said die closing device.

3. A vertical injection molding machine according to claim 1, wherein said injection unit is swingably carried by said shifting means.

4. A vertical injection molding machine according to claim 3, wherein said injection unit is hinged to said shifting means through a hinge shaft and is adapted to be swung by a cylinder about the axis of said hinge shaft.

5. A vertical injection molding machine according to claim 4, wherein said cylinder is adapted to be extended and retracted hydraulically.

6. A vertical injection molding machine according to claim 4, wherein said cylinder accommodates a spring which urges said cylinder in a retracting direction.

7. A vertical injection molding machine according to claim 1, wherein said shifting means include a truck carrying said injection unit and rails along which said injection unit is moved.

8. A vertical injection molding machine according to claim 7, wherein said rails are laid horizontally.

9. A vertical injection molding machine according to claim 1, wherein said link bars are connected at their upper ends to said frame means and at their lower ends to said injection unit.

10. A vertical injection molding machine according to claim 1, wherein said pair of dies include an upper die and a lower die, said lower die being supported by a platen, said platen including an aperture for receiving said injection unit.

11. A vertical injection molding machine according to claim 10, wherein said aperture is enlarged at its portion nearest the outside of said frame means to allow said injection unit to move outside said frame means.

12. A vertical injection molding machine comprising:
  (a) frame means;
  (b) an upper die and a lower die which, when brought together, define a die cavity therebetween;
  (c) a die closing device for causing relative vertical movement between said dies and having a movable platen supporting said upper die and a stationary platen supporting said lower die;
  (d) an injection unit disposed below said die closing device;
  (e) means for shifting said injection unit to the outside of said frame; and
  (f) a compression forming cylinder device for forcibly creating a gap between said upper and lower dies under the influence of the die closing force produced by said die closing device, said compression forming cylinder device being provided coaxially in at least one tie bar between said upper and lower dies.

13. A vertical injection molding machine according to claim 12, further comprising a link mechanism for moving said nozzle of said injection unit into and out of contact with said lower die.

14. A vertical injection molding machine according to claim 13, wherein said link mechanism includes cylinders for moving said injection unit to a position where said nozzle can be inspected and maintained easily, and link bars which guide and limit the movement of said nozzle of said injection unit.

15. A vertical injection molding machine according to claim 12, wherein said compression forming cylinder device has a piston chamber disposed coaxially with a tie-bar arranged between said movable platen and said stationary platen, a piston received in said piston chamber, and a pressing member connected at its one end to a movable member connected to said piston and at its other end to said upper die, said piston chamber being adapted to be supplied with pressurized oil when said upper die and lower dies have been brought together by the force of said die closing device, thereby causing said piston to move in such a direction as to enable said movable member to drive said upper die opposite to the die closing direction.

16. A vertical injection molding machine according to claim 15, wherein said pressing member extends through an aperture formed in said stationary platen.

* * * * *

UNITED STATES PATENT AND TRADEMARK OFFICE
CERTIFICATE OF CORRECTION

PATENT NO. : 4,902,220

DATED : Feb. 20, 1990

INVENTOR(S) : T. NAKAGAWA

It is certified that error appears in the above-identified patent and that said Letters Patent is hereby corrected as shown below:

Title page:
   Item
   [57], in the Abstract, line 4, after "device" insert ---(3)-- --;

column 1, line 52, change "born" to ---borne---;
       column 1, line 64, delete "size";
       column 2, line 47, change "of of" to ---of---;
       column 3, line 7, change "shows" to ---show---;
       column 3, line 13, change "opened" to ---open---;
       column 4, line 4, change "are" to ---is---;
       column 4, line 13, insert ---33--- after "nozzle";
       column 4, line 19, change "hinge" to ---hinged---;
       column 4, line 34, change "hinge" to ---hinged---;
       column 4, line 34, change "born" to ---borne---;
       column 4, line 66, after "other" delete "parts";
       column 4, line 68, change "works" to ---work---;
       column 5, line 20, change "works" to ---work---;
       column 5, line 24, change "works" to ---work---;
       column 5, line 54, change "30" to ---38---;
       column 6, line 7, change "the the" to ---the---;
       column 6, line 19, change "3" to ---33---;
       column 8, line 28 (claim 1, line 3) insert ---said--- after "direction,"; and

UNITED STATES PATENT AND TRADEMARK OFFICE
CERTIFICATE OF CORRECTION

PATENT NO. : 4,902,220

DATED : Feb. 20, 1990

INVENTOR(S) : T. NAKAGAWA

It is certified that error appears in the above-identified patent and that said Letters Patent is hereby corrected as shown below:

column 8, line 45 (claim 2, line 2), delete "of".

Signed and Sealed this

Twenty-fourth Day of December, 1991

Attest:

HARRY F. MANBECK, JR.

*Attesting Officer*  *Commissioner of Patents and Trademarks*